Nov. 14, 1967     J. FRANGOS     3,352,464
PRESSURE FLUID METERING AND DISPENSING CONTAINER VALVES
Filed June 15, 1966
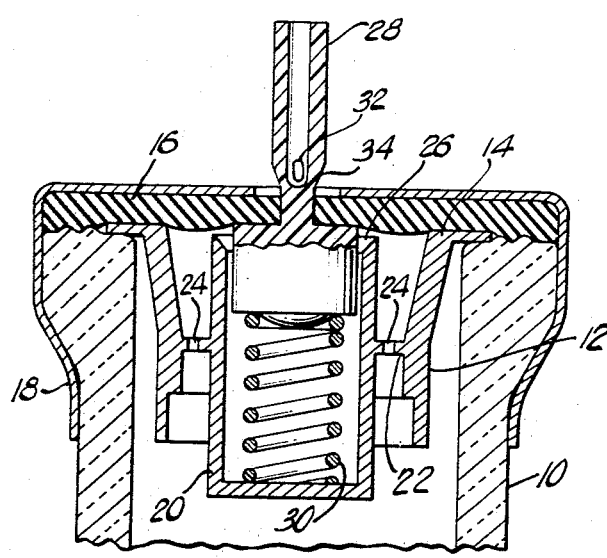
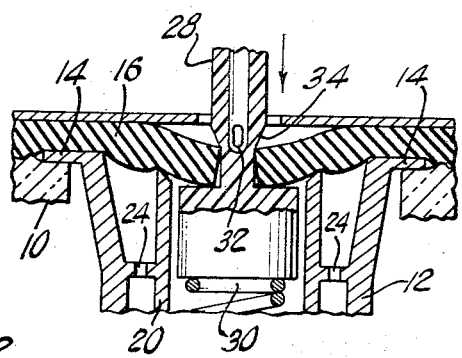
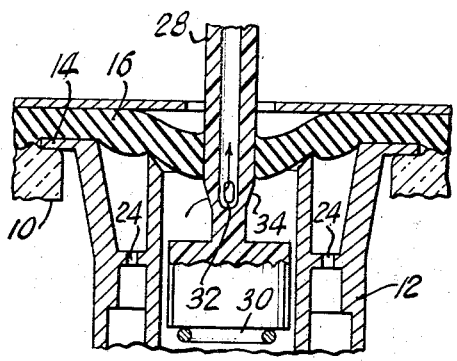
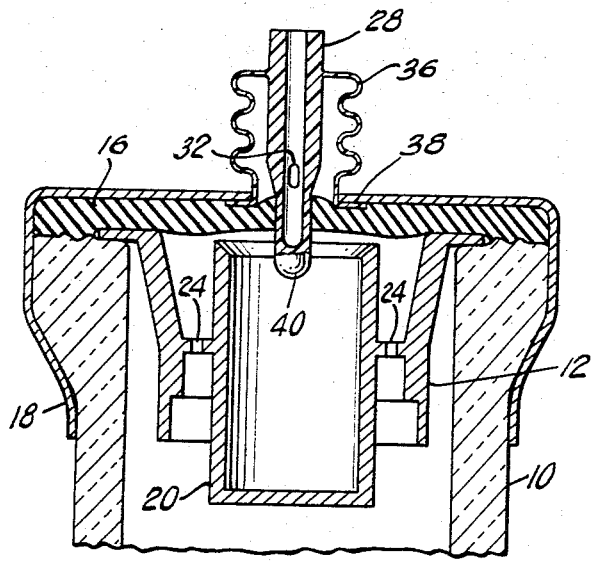
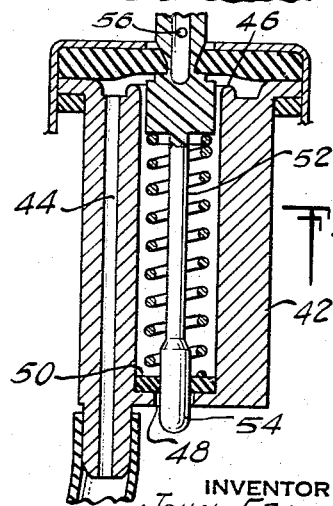
INVENTOR:
JOHN FRANGOS
BY
Curtis, Morris & Safford
ATTORNEYS.

United States Patent Office 3,352,464
Patented Nov. 14, 1967

3,352,464
PRESSURE FLUID METERING AND DISPENSING CONTAINER VALVES
John Frangos, Brooklyn, N.Y., assignor to Revlon, Inc., New York, N.Y., a corporation of Delaware
Filed June 15, 1966, Ser. No. 557,799
7 Claims. (Cl. 222—402.2)

ABSTRACT OF THE DISCLOSURE

A metering valve for pressurized fluid containers in which communication between the container proper and a metering chamber therein is interrupted by depression of a valve stem having a portion of small diameter extending into said container and a portion of large diameter, normally outside said container, defining a cam surface therebetween. On depression of the valve stem, the cam surface first depresses a flexible gasket to seal the metering chamber. The valve stem then penetrates the gasket to discharge the contents of the metering chamber through a terminal orifice in the valve stem. The valve is provided with resilient means inside or outside the container normally positioning the valve stem terminal orifice out of communication with the metering chamber.

---

This invention relates to metering valves for aerosol containers. In many of the valves used in aerosol containers today there are a multiplicity of rubber parts which are exposed to the product in the container with the result that the product is often discolored and, in the case of oral pharmaceutical products, objectionable taste is produced.

It is an object of the present invention to create a valve that has a minimum of parts and in which the area of rubber surface exposed to the product or contents of the container is reduced to the minimum.

It is another object of the invention to so construct the device that when the operating stem is in one position, the metering chamber will be open to receive from the container the portion of the contents which is to be metered and when the valve stem is in another position, the chamber will be isolated from the contents of the container.

It is another object of the invention to provide a metering valve for an areosol container which is simple in construction, easy to assemble, inexpensive to manufacture and which will permit the contents of the container to maintain the original condition.

It is a further object of the invention to so construct the device that the container may be pressure filled through the metering chamber upon a simple depression of the valve.

Other objects of the invention will appear as the description of the embodiments illustrated in the drawing progresses.

In the drawings,

FIGURE 1 is a vertical sectional view showing one form of my invention with the several parts thereof in the positions they will occupy when the container is sealed against discharge but when the metering chamber is open to the contents of the body of the container;

FIGURE 2 is a vertical sectional view showing the relative positions of the parts when the metering chamber has been closed by the depression of the valve stem while the chamber is still sealed off against discharge;

FIGURE 3 is a view similar to FIGURE 2 in which the metering chamber is shown as closed from the container but with the discharge orifice open;

FIGURE 4 is a vertical sectional view of a modification of my invention showing a different type of spring which eliminates a part from the metering chamber;

FIGURE 5 is a vertical sectional view of a second modification of my invention in which provision is made for pressure filling.

Referring now to FIGURES 1, 2 and 3, the container 10 supports within it a valve body 12 by means of a flange 14 on the upper end of the body. A rubber gasket 16 overlies the flange 14 and the open end of the container, thus closing this open end.

The gasket is secured in place by a ferrule 18.

While this gasket has a certain amount of rigidity, it is resilient and flexible enough to allow its central portion to be depressed as disclosed in FIGURES 2 and 3.

The valve body 12 supports a metering chamber 20 by means of a web 22. This web is provided with ports 24. Normally the upper end of the chamber 20 is open at 26, thus establishing communicaiton between the body of the container and the metering chamber.

The valve stem 28 is normally held in the position shown in FIGURE 1 by spring 30 in which position the discharge orifice 32 in the valve stem is out of communication with the metering chamber.

When the valve stem and orifice 32 are in the position shown in FIGURE 1, the upper end 26 of the valve chamber will be open to the contents of the container by way of the ports 24 as heretofore pointed out.

When, however, the valve stem is depressed into the position shown in FIGURE 2, the tapered undercut 34 thereof will have engaged the closely fiting gasket and flexed the same downwardly sufficiently to close the upper end of the metering chamber 20 while the orifice 32 is still out of communication with the metering chamber.

When, however, the valve stem is further depressed the tapered undercut will still maintain the upper end of the metering chamber closed and thus isolate the metering chamber from the main contents of the container. At this time the orifice 32 will be open to the contents of the metering chamber and thus the contents will be pressure ejected through the valve stem by way of the orifice therein.

With this construction it will be seen that there are relatively few parts and that only a relatively small area of rubber is exposed to the contents of the container or of the metering chamber when the latter is isolated from the container.

This structure is relatively simple and reduces the number of rubber parts ordinarily found in aerosol containers of this general type.

I have found that it is possible to further reduce the number of parts within the container by eliminating the spring 30 and substitutng therefor a flexible resilient plastic bellows-like spring 36 which is secured to the container at 38 by the ferrule 18 and which may, if desired, be made integral with the plastic valve stem 28.

In this connection the use of the bellows-like spring on the outside of the container eliminates the usual spring 30 in the metering chamber together with the spring guide against which one end of the spring operates as shown in FIGURE 1. It also makes it possible to simplify the construction of the valve stem because it is only necessary to close the lower end of the valve stem channel as at 40. The valve stem in this instance is provided with the same type of tapered undercut as in the earlier described construction and operates in conjunction with the gasket 16 in the manner heretofore described.

In the form of invention illustrated in FIGURE 5 the metering chamber 42 is of somewhat different form from that illustrated in FIGURES 1 through 4. It is provided with a channel 44 that communicates with the dip tube and that communicates with the metering chamber at its upper end as at 46.

The lower end of the metering chamber is provided with a passage 48 which is surrounded by a lower gasket 50. The channel valve is provided with extending shank 52 on the lower end of which is a valve head 54 which is adapted to extend into and open or close the passage 48 as the valve stem is depressed or released. This valve stem in this form of the invention may be actuated by a suitable spring such for instance as that shown in FIGURES 1 or 4.

The relationship between the valve head 54 and the orifice 56, which corresponds to the orifice 32 of the previously described form, is such that when the orifice is moved into a position such as shown in FIGURE 3 and the upper end of the metering chamber is closed by the gasket 16, the passage 48 will be closed and the contents of the metering chamber only will be free to be ejected through the orifice 32. When, however, the valve stem is moved further downwardly the valve head 54 will open the passage 48 and the container may thus be pressure filled through the metering chamber.

While I have illustrated and described preferred embodiments of my invention, it is to be understood that some changes may be made in the details of the structures without departing from the spirit of the invention or exceeding the scope of the claims.

I claim:

1. A metering valve for releasing pressurized fluid from an open ended container in measured amounts comprising a valve body within said container, a metering chamber supported by said valve body and having a normally open end establishing communication between said metering chamber and said container, a flexible resilient diaphragm extending across the open end of said metering chamber and constructed and arranged to be flexed into closing relationship to said open end of said metering chamber, a valve stem extending through said diaphragm and with said metering chamber, said valve stem having a first inner portion of relatively smaller lateral dimension than a second outer portion thereof and an intervening portion of laterally increasing dimension from said first portion to said second portion forming a cam surface, said valve stem having a longitudinal channel open at the outer end of said stem and having an orifice adjacent its inner end and aligned with said intervening portion of said valve stem, resilient means normally positioning said orifice beyond the outer face of said diaphragm, whereby when said valve stem is moved inwardly in the container, said intervening portion and said second portion of said valve stem will first depress said diaphragm to close the adjacent end of said metering chamber while said orifice is out of communication with said metering chamber and will then move said orifice into communication with said metering chamber.

2. The metering valve recited in claim 1 wherein said resilient means is located within said metering chamber.

3. The metering valve recited in claim 1 wherein said resilient means is located outside of the container.

4. The metering valve recited in claim 3 wherein said valve stem is plastic material and said resilient means is constituted by a resiliently expansible plastic material of bellows-like form.

5. The metering valve recited in claim 4 wherein said resilient means is integral with said valve stem and is located outside said metering chamber.

6. A metering valve for releasing pressurized fluid from a container in measured amounts comprising a metering chamber within said container and having communication therewith for the passage of fluid from the container to the chamber, a yieldable gasket, aligned with said chamber, having an opening therethrough, a valve stem, extending through said opening and having a terminal orifice therein, said valve stem having a peripheral cam face adapted upon limited movement to depress said gasket into contact with said metering chamber to close the same and upon further movement to align said orifice with said metering chamber and resilient means normally positioning said terminal orifice outside said metering chamber, beyond the outer face of said yieldable gasket.

7. The metering valve recited in claim 6 wherein said metering chamber is provided with a port at its lower end for communication with said container and is provided with a dip tube adapted to extend into said pressurized fluid within said container and further adapted to communicate with said metering chamber when said gasket is inoperative to close said metering chamber, and wherein said valve stem is provided with a head portion adapted to maintain said port closed until said gasket closes the upper end of said chamber and until said orifice has moved into communication with said metering chamber, said head being operable thereafter, on further inward movement of said valve stem, to open said port whereby said container may be pressure filled through said metering chamber and said valve stem.

References Cited
UNITED STATES PATENTS

| | | | |
|---|---|---|---|
| 2,856,105 | 10/1958 | Ward | 222—444 X |
| 3,033,425 | 5/1962 | Gawthrop | 222—402.2 X |
| 3,073,489 | 1/1963 | Friedman | 222—447 X |

ROBERT B. REEVES, *Primary Examiner.*

N. L. STACK, *Assistant Examiner.*